ically driven by a motor 10 at a suitable sweeping speed.

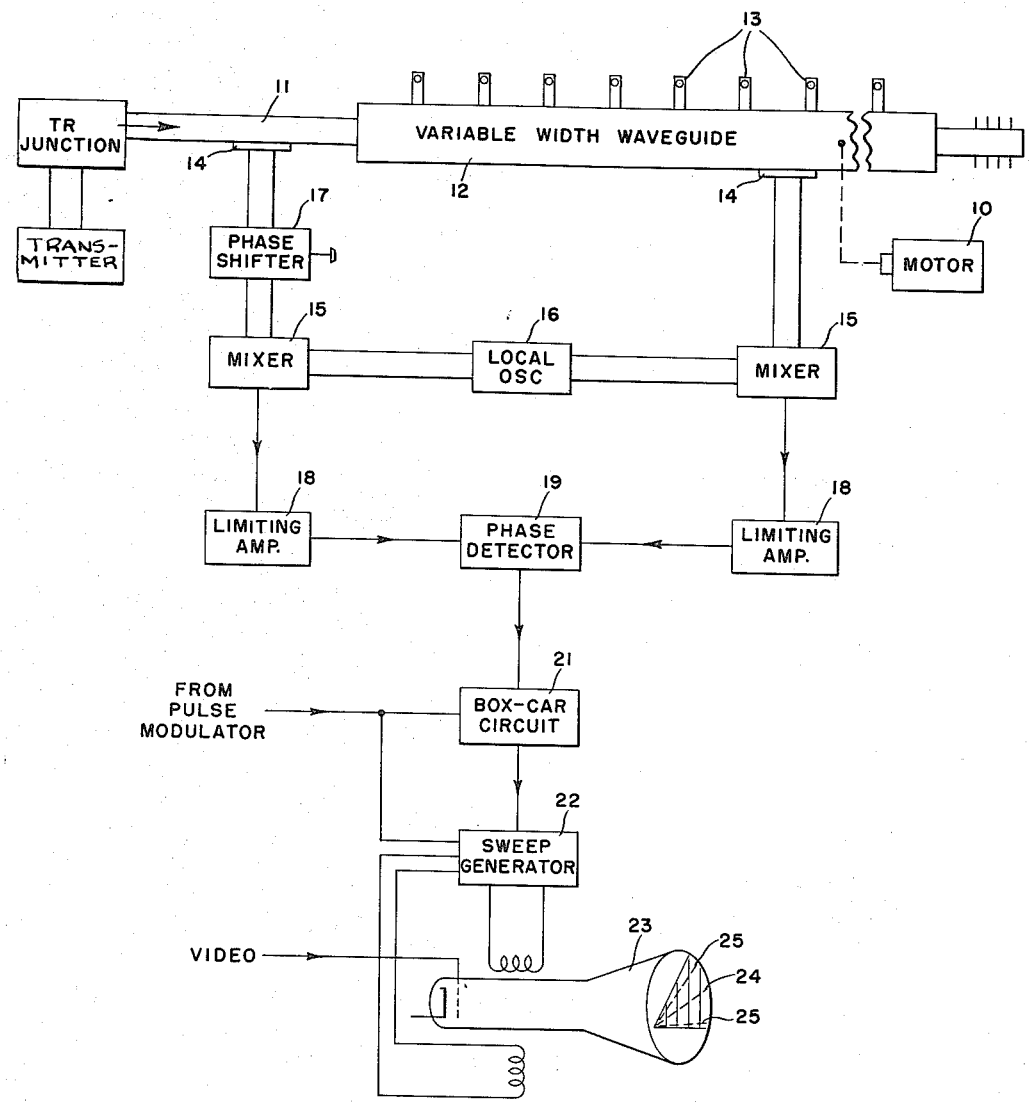

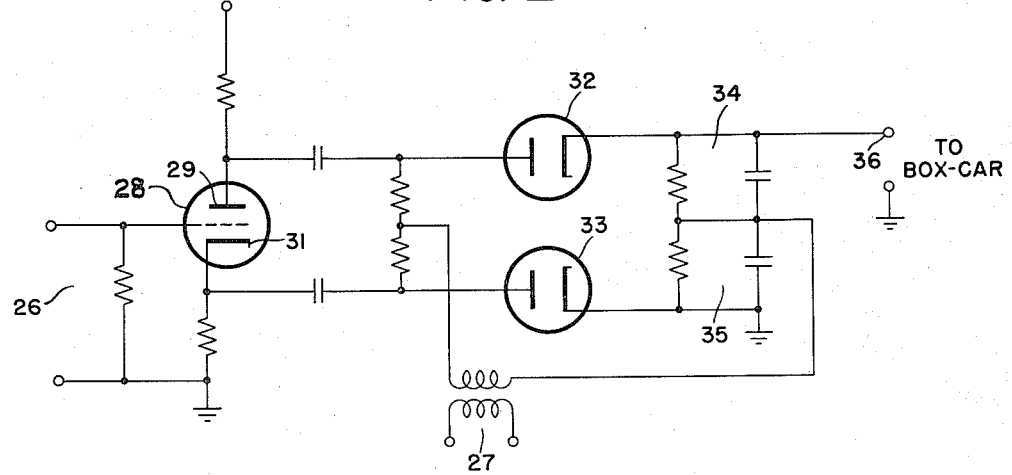
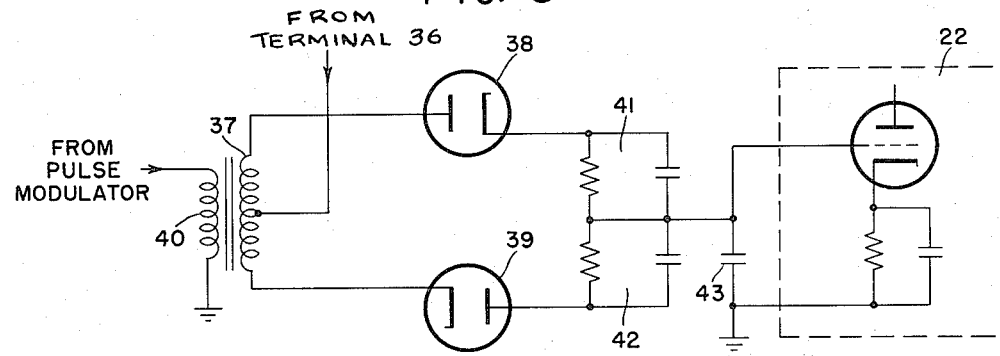

United States Patent Office 2,747,178
Patented May 22, 1956

2,747,178
ANTENNA BEAM POSITION INDICATOR

William G. Alexander and Charles McL. Harden, Baltimore, Md., assignors to Bendix Aviation Corporation, Towson, Md., a corporation of Delaware Application December 28, 1951, Serial No. 263,782

4 Claims. (Cl. 343—11)

This invention relates to phase comparison circuits and more particularly to the application of such circuits for deriving a control signal useable in variable phase systems.

This invention finds particular application in ground controlled approach (GCA) radar landing systems for aircraft and, while not limited thereto, will be described with reference to such a system.

In present day GCA systems there is generally provided one or more antennas having specially shaped directive patterns for the transmission and reception of pulsed high frequency energy and means for sweeping the directive patterns through some predetermined angle. A cathode-ray tube is employed having a sector display with the cathode-ray beam sweeping in synchronism with the antenna sweeping to provide positional information of aircraft in the volume swept.

The antennas which are employed in systems of this type generally comprise a length of variable width waveguide with a plurality of elementary dipole radiators spaced along one surface of the guide and coupled to the wave energy path within the guide. The width of the waveguide is varied cylically to vary the guide velocity-of-propagation in a controlled manner and thereby vary the relative phase of excitation of elements of the dipole array to produce the desired pattern sweeping. In order to properly control the cathode-ray beam position in accordance with the antenna pattern position in space it has heretofore been the practice to provide an electrical analogue of the mechanical motion used to change the waveguide width. This arrangement has inherent shortcomings due to the complex relationship between the motion of the waveguide and the many electrical conditions which combine to determine the position of the antenna pattern. Thus the aforementioned analogue may, at best, provide only an approximation to the desired width-position function. It is furthermore apparent that any changes in electrical performance, such as those due to wear, temperature or frequency shift and the like, will produce pattern position changes which will in no way be reflected in an analogue device operated solely from the mechanical motion of the variable width guide.

It is, accordingly, a primary object of the present invention to provide means for deriving a reliable electrical analogue of an antenna pattern position.

Another object is to provide a phase comparison system for a high frequency device.

A further object is to provide, in a phase controlled antenna pattern system, a pattern position indicator responsive to the phase of samples derived from the antenna.

These and other objects of the invention will become apparent from the following detailed description taken in conjunction with the accompanying drawings wherein:

Fig. 1 is a view functionally representing a system for control of a cathode-ray beam sweeping in response to phase variations in a radar antenna;

Fig. 2 is a schematic diagram of a phase detector circuit; and

Fig. 3 is a schematic diagram of a box-car circuit.

Referring now to Fig. 1, there is shown a waveguide 11 connected to a variable width waveguide antenna 12 for coupling thereto a conventional transmit-receive radar system, not shown. Coupled to the energy within the waveguide 12 are a plurality of dipoles 13 which are spaced to form a broadside array. The relative phasing of individual dipoles in the array 13 varies with the variation in width of the waveguide 12 which is mechanically driven by a motor 10 at a suitable sweeping speed. The position in space of the radiation pattern from the array 13 is thus related to the mechanical variation of the width of the waveguide antenna 12. At suitable positions on the waveguide 11 and antenna 12, directional couplers 14 are placed to extract a sample of the electromagnetic energy present at these points. The low level energy from the couplers 14 is supplied to individual mixers 15 which are both supplied with synchronous heterodyne signals from a local oscillator device 16. To establish a desired initial phase reference relation between the sampled signals a phase shifter 17 may be provided in one of the lines from the coupling devices 14.

The intermediate frequency outputs of the mixers 15 are supplied to amplifier channels 18, respectively, where the signal is amplified to a suitable level and conditioned for phase comparison. Conditioning for phase comparison connotes the elimination of amplitude variations between the two waves to be compared as is well known in the art and is shown, for example, in U. S. Patent No. 2,416,517, wherein limiting amplifiers are employed. Devices other than limiting amplifiers could be used in the channels 18, if desired, as reflex amplifiers or amplifiers having high quality AGC action. The constant amplitude outputs of the amplifiers 18 are supplied to a phase detector 19 which produces an output signal which varies in amplitude as the relative phase of the input signals thereof, as will be more fully described hereinafter. The amplitude analogue pulse from the detector 19 is supplied to a box-car circuit 21 which simultaneously receives a synchronizing pulse from the transmitter modulator, not shown. The box-car circuit 21 operates, as will be described, to produce a signal the amplitude of which remains at a substantially constant level between succeeding applications of pulses from the modulator and the detector 19 and having an amplitude determined by the last occurring pulse from the detector 19. The output of the box-car circuit is supplied to a sweep generator 22 which deflects the beam of a cathode-ray tube 23 to produce a sector sweeping line 24 indicative of the position of the directive pattern of the array 13. As the motor 10 drives the waveguide antenna 12 alternately to the limits of travel, the unintensified display line 24 sweeps through an angle between extreme positions 25 corresponding to the angle swept by the antenna pattern. Video signals produce visible target, range mark and like indications by suitably intensifying portions of the radial line 24.

In Fig. 2 the details of a suitable phase detector circuit are shown. The circuit has separate input terminals 26, 27 for the respective signals from the amplifiers 18. The signal at the terminals 26 is applied to a phase inverter 28 which produces oppositely phased output signals of equal amplitude at the plate 29 and cathode 31 thereof. The oppositely phased signals are combined additively and subtractively with the signal from the terminals 27 and the resultant signals are applied to a pair of balanced diodes 32, 33 having symmetrical RC load circuits 34, 35. The action of the phase detector circuit is to produce signals at output terminal 36 having opposite peak polarities depending on whether the input signals at the terminals 26, 27 have in-phase or 180° out-of-phase relation therebetween. For intermediate phase relation intermediate amplitude signals are produced at the terminal 36 with respect to ground.

The signal from the terminal 36 is supplied to the mid-point of a transformer winding 37 of Fig. 3. The winding 37 is a transformer secondary coupled to a primary winding 40 which is energized with a modulator pulse from the transmitter pulse-modulator. The winding 37 is connected to series aiding diodes 38, 39 which have symmetrical RC load circuits 41, 42. The mid-point of the circuits 41, 42 is connected by means of a capacitor 43 to ground. The voltage across the capacitor 43 is applied to control the angular position sweep voltage generated by the sweep generator 22.

In operation the circuit of Fig. 3 charges the capacitor 43 to a voltage representative of the amplitude of the output signal from terminal 36 each time the modulator pulse in winding 40 is applied. The action occurs as the modulator pulse coupled into the winding 37 causes conduction in both of the diodes 38 and 39, thereby producing a voltage division across the circuits 41 and 42. The potential of the mid-point between the circuits 41, 42 is determined by the differential action of the phase detector voltage from terminal 36 with the modulator pulse voltage coupled into the winding 37. The capacitor 43 acquires the mid-point voltage established during the pulse and since it has only high resistance discharge paths in the absence of conduction in the diodes 38, 39, maintains that voltage until the next pulse establishes a new charged level.

Obviously, many modifications may be made in the details of the preferred embodiment here disclosed without departing from the true spirit and scope of the present invention.

What is claimed is:

1. A radar system comprising; a source of pulsed microwave energy, a narrow beam sweeping antenna energized from said source, said antenna comprising a section of rectangular waveguide having an inside dimension uniform throughout the length of said section and adjustable within predetermined limits for sweeping said beam, and a plurality of radiators arranged along the length of said section for transducing electromagnetic energy between inside said waveguide and free space; means for periodically varying said dimension between said limits; a first directional coupler for deriving a portion of the forward traveling wave from said source; a second directional coupler for deriving a portion of the forward traveling wave at a predetermined point in said section; a local source of oscillations; means for heterodyning said portions with synchronous local oscillation energy from said local source to produce individual synchronous intermediate frequency signals; means for individual amplifying and eliminating envelope amplitude variations of said signals; means responsive to phase variations between said signals for producing a voltage representative of said phase variation; means for substantially sustaining said voltage between adjacent pulses of said source; a cathode-ray indicator; and means responsive to said sustained voltage for deflecting said ray in accordance with the sweeping of said beam.

2. A radar system comprising, a source of pulsed microwave energy, a narrow beam sweeping antenna energized from said source, said antenna comprising an array of radiators and means for supplying said radiators with adjustable relative phase from said source to control the position of said beam, means for periodically varying said phase in a predetermined manner to effect said sweeping, means for deriving a first portion of said energy from said source, means for deriving a second portion of said energy from a predetermined point of variable phase in said antenna, means operative during each, pulse of said energy for comparing said portions and producing a voltage of magnitude representative of the phase difference between said portions, means for substantially sustaining said voltage between adjacent pulses of said energy, a cathode-ray indicator, and means responsive to said voltage for deflecting said ray in accordance with the sweeping of said beam.

3. A radar system comprising, a source of pulsed microwave energy, a narrow beam sweeping antenna energized from said source, said antenna comprising an array of radiators and means for supplying said radiators with adjustable relative phase from said source to control the position of said beam, means for periodically varying said phase in a predetermined manner to effect said sweeping, means for deriving a first portion of said energy from said source, means for deriving a second portion of said energy from a predetermined point of variable phase in said antenna, an oscillator providing a pair of synchronous signals, a pair of mixers for heterodyning said first and second portions, respectively with said pair of signals, means for amplifying and eliminating envelope amplitude variations of the intermediate frequency output signal from said mixers, means responsive to phase variations between said intermediate frequency signals for producing a voltage representative of said phase variation, means for substantially sustaining said voltage between adjacent pulses of said source, a cathode-ray indicator, and means responsive to said sustained voltage for deflecting said ray in accordance with the sweeping of said beam.

4. A radar system comprising; a source of pulsed microwave energy; a narrow beam sweeping antenna energized from said source, said antenna including a section of waveguide having an inside dimension adjustable throughout the length of said section within predetermined limits, and a plurality of radiators arranged along the length of said section for transducing electromagnetic energy between inside said waveguide and free space; means for periodically varying said dimension between said limits; means for deriving a first portion of the wave energy from said source; means for deriving a second portion of the wave energy at a predetermined point in said section having a phase relation relative to said first portion representative of the directional characteristics of said antenna; means operative during each pulse of said energy for comparing said portions and producing a voltage of magnitude representative of the phase difference between said portions, means for substantially sustaining said voltage between adjacent pulses of said energy, a cathode-ray indicator, and means responsive to said voltage for deflecting said ray in accordance with the sweeping of said beam.

References Cited in the file of this patent

UNITED STATES PATENTS

| | | |
|---|---|---|
| 2,403,728 | Loughren | July 9, 1946 |
| 2,433,804 | Wolff | Dec. 30, 1947 |
| 2,480,208 | Alvarez | Aug. 30, 1949 |
| 2,518,564 | Nebel | Aug. 15, 1950 |
| 2,553,294 | Blewett | May 15, 1951 |